United States Patent Office 3,525,560
Patented Aug. 25, 1970

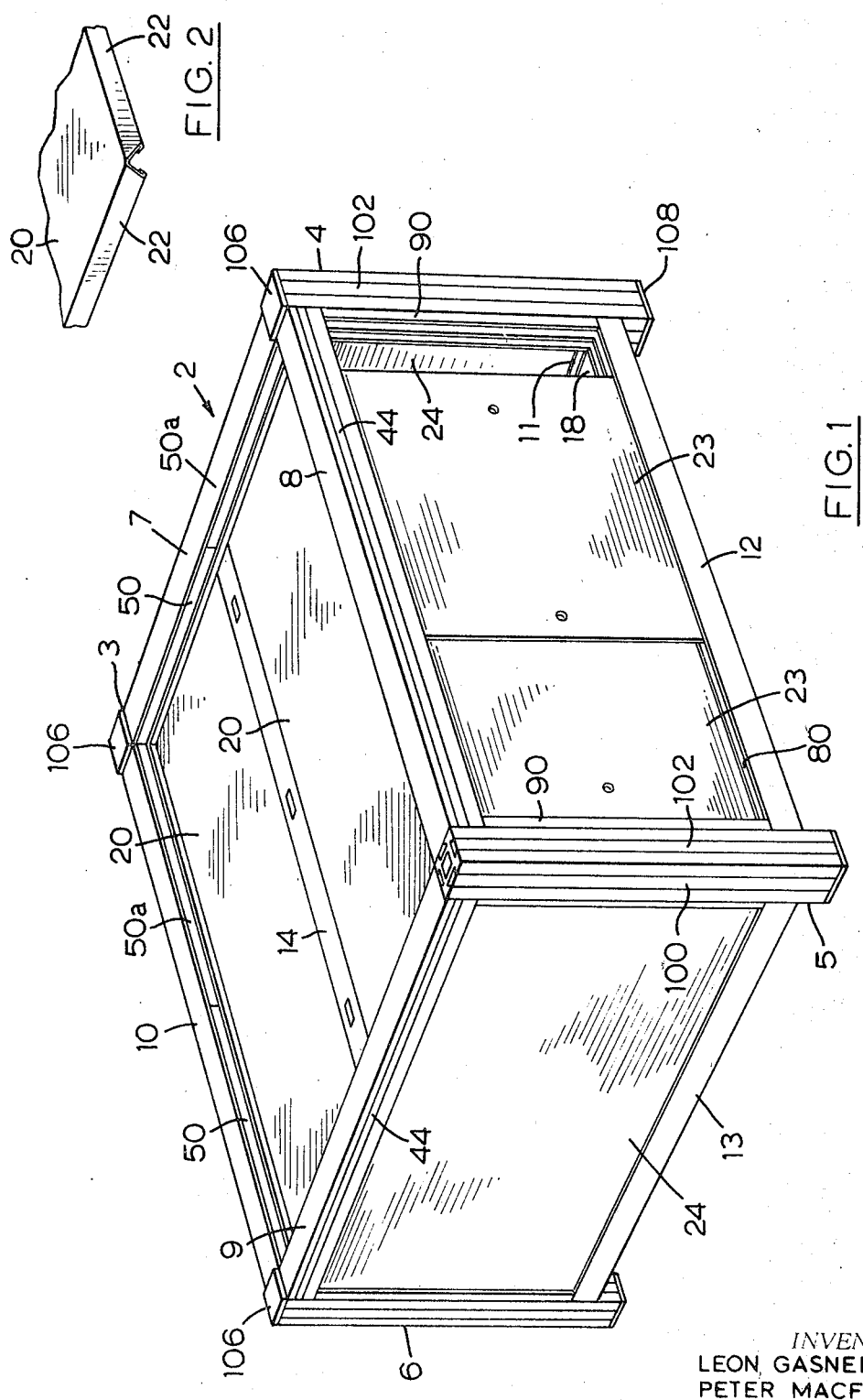

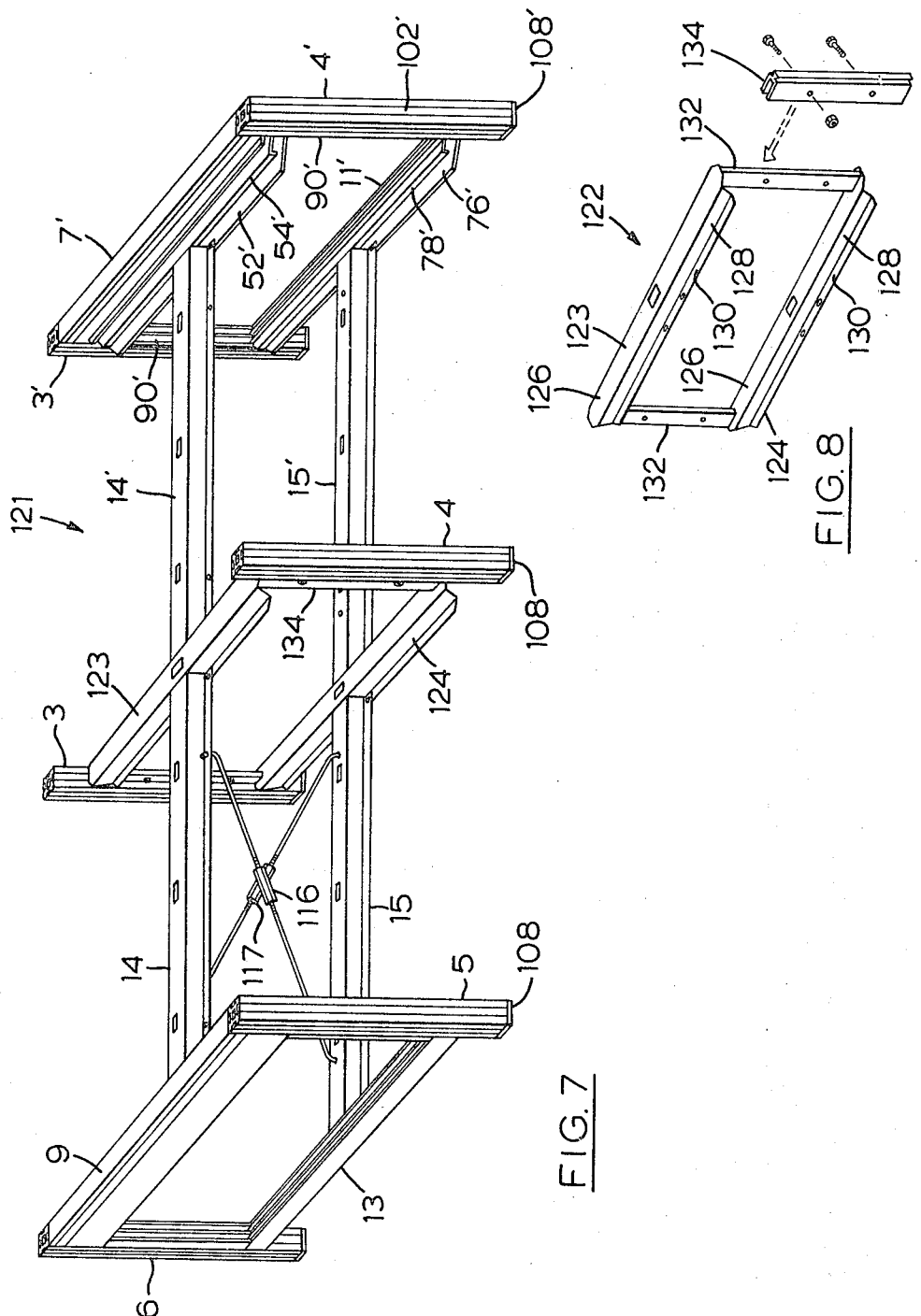

3,525,560
FRAME STRUCTURE
Leon Gasner, Downsview, Ontario, and Peter Mac-
Farlane, Agincourt, Ontario, Canada, assignors, by
mesne assignments, to Leon Gasner, Downview,
Ontario, Canada
Filed Apr. 18, 1968, Ser. No. 722,373
Claims priority, application Canada, Mar. 19, 1968,
015,265
Int. Cl. A47b 47/00, 17/00, 17/08
U.S. Cl. 312—257
14 Claims

ABSTRACT OF THE DISCLOSURE

A frame structure for display tables and the like, having grooves extending the length of each corner post, and top and bottom rails joining the posts. During assembly, bottom spacers interlocking with the grooves are slid down to the bottoms of the grooves. The ends of the bottom rails are then inserted in and slid down the grooves to rest on the bottom spacers. Intermediate spacers are slid down the grooves to rest on the bottom rails, and the ends of the top rails are then slid down the grooves to rest on the intermediate spacers. Shelves rest on the top and bottom rails.

This invention relates to a frame structure for cabinets, display tables, and the like, and in particular, it relates to a frame structure that can very easily be assembled and disassembled at a place of use.

Storage and display tables and cabinets are used in a wide range of applications, a typical such use being in department stores where they are used to contain and display merchandise. Since these tables and cabinets are usually bulky structures, it is desirable to provide structures that can be transported to a site such as a department store in disassembled from and then assembled at the site. In addition to this requirement for easy assembly, there is a cost requirement. It is usually important that storage and display tables of the type used in department stores be fabricated at the lowest possible cost, and yet the appearance of these tables must be attractive.

Accordingly, it is an object of the present invention to provide a table structure of a type that may be easily and quickly assembled or disassembled on site with a minimum requirement for tools. It is a further object of the invention to provide a structure the visible parts of which do not require any welded joints. This reduces the cost of finishing the structure to provide an attractive appearance.

A typical frame structure according to the invention includes:

(a) a post having a longitudinal interlocking groove extending longitudinally along at least one face thereof for the entire length of said post, (b) a bottom rail having a first interlocking projection at each end thereof, said projection being slidable in said groove and mating with said groove to prevent movement of said bottom rail away from said post, (c) an elongated intermediate spacer member having a second interlocking projection thereon, so that said second projection may be inserted in said groove after said bottom rail is connected to said post and said second projection may then be slid along said groove until the bottom of said spacer member rests on the top of said bottom rail, (d) and a top rail having a third interlocking projection at each end thereof, so that after said bottom rail and said intermediate spacer member are connected to said post, said third interlocking projection may be slid into said groove and slid downwardly until the bottom of said top rails rests on the top of said intermediate spacer member.

The frame structure will also typically include a bottom spacer member shaped to form a fourth interlocking projection along its length, so that the bottom spacer member can be inserted in the groove initially and slid down to the bottom of the post. The bottom rail is then supported on the bottom spacer member and is spaced from the ground.

Further objects and adavntages of the invention will appear from the following description, taken together with the accompanying drawings, in which:

FIG. 1 is a perspective view of a typical display table made in accordance with the present invention;

FIG. 2 is a perspective view of a portion of a shelf of the display table of FIG. 1;

FIG. 7 is a diagrammatic perspective view showing a partly assembled modified and extended table similar to the table of FIG. 1; and FIG. 8 is a perspective view showing a side frame used with the table of FIG. 7.

Figure 5:
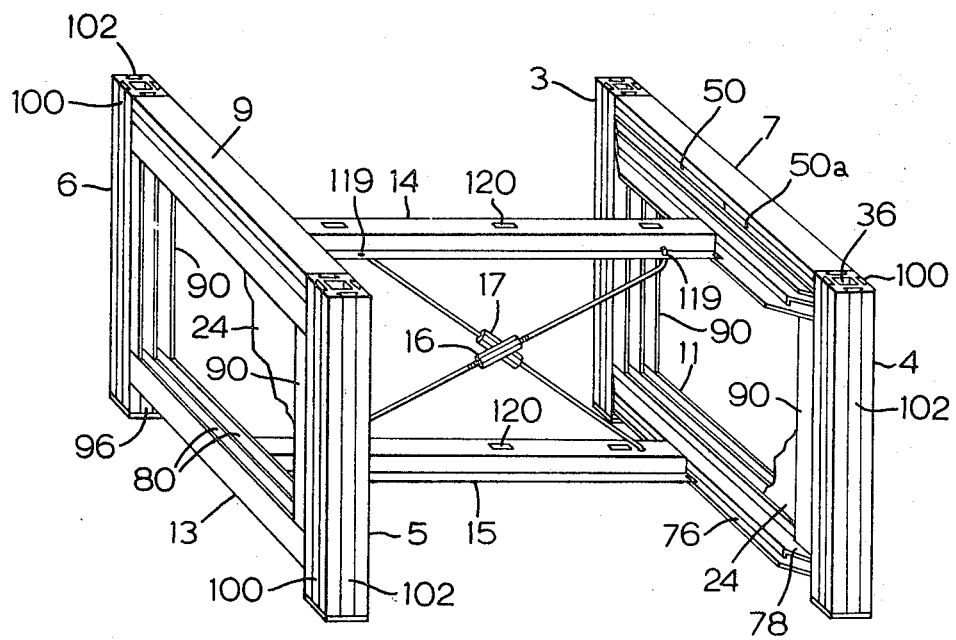
FIG. 5 is a perspective view showing the table of FIG. 1 partially assembled.

Reference is first made to FIGS. 1 and 5, which show a typical display table 2 according to the invention. FIG. 1 shows the table 2 fully assembled, while FIG. 5 shows it partly assembled. As shown, the table 2 includes four corner posts 3, 4, 5, 6 joined by four top rails 7, 8, 9, 10 and by four bottom rails. Only three of the bottom rails appear in FIGS. 1 and 5 and are indicated at 11, 12, 13.

The two side top rails 7, 9 are joined by an upper middle support 14, while the two side bottom rails 11, 13 are joined by a lower middle support 15. Turnbuckles 16, 17 are provided in an X brace configuration to tighten the middle supports 14, 15 and reduce side to side sway in the table 2. A two section bottom shelf 18 rests on the the bottom rails and on the lower middle support 15, while a two section top shelf 20 rests on the top rails and on the upper middle support 14. The shelves 18, 20 are identical and are typically made of sheet metal with the edges turned downwardly and inwardly, as shown at 22 in FIGURE 2.

Two sliding doors 23 are fitted at the front of the table 2, between the top and bottom rails 8, 12. At the sides of the table, panels 24 (typically made from sheet steel, plywood or Masonite) are fitted between the respective top and bottom rails, while the back of the table may contain either sliding doors or a simple panel (not shown) between its top and bottom rails.

Figure 3:
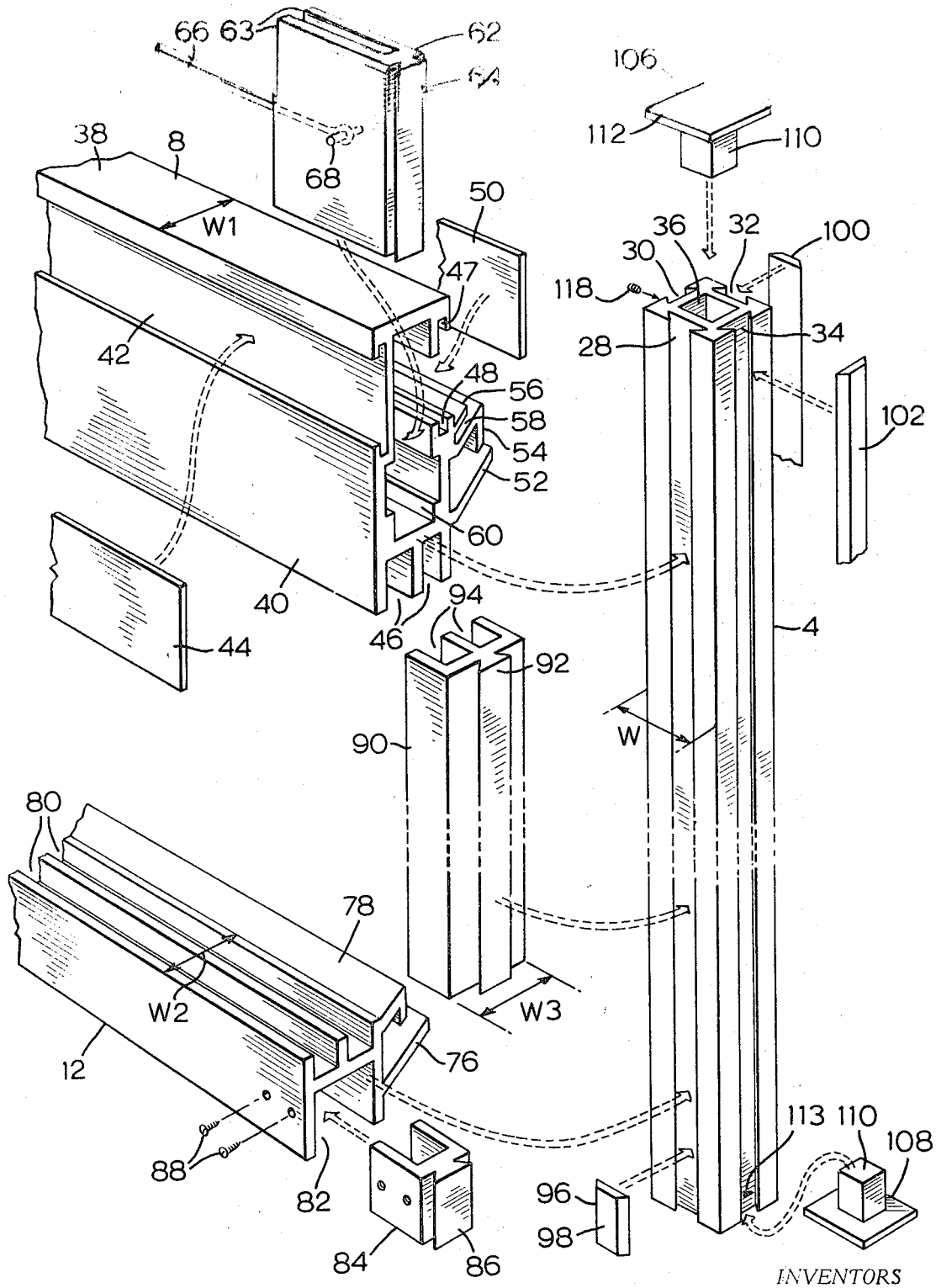
FIG. 3 is a perspective exploded view showing the manner of assembly of the major components of the table of FIG. 1.
Figure 4:
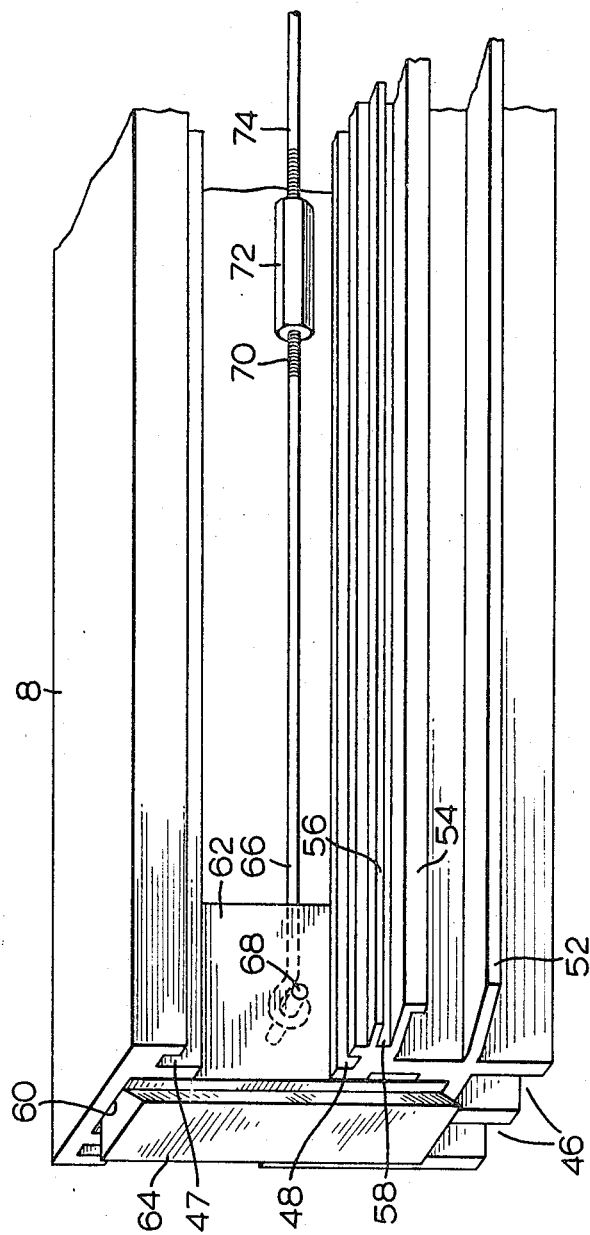
FIG. 4 is a perspective view showing a portion of the top rail of the table of FIG. 1.

Reference is next made to FIGS. 3 and 4, which show the details of a corner post and a top and bottom rail and associated components, and their manner of assembly. FIGS. 3 and 4 show the corner post 4 and its associated top and bottom rails 8 and 12, but it will be appreciated that in the embodiment to be described, all of the corner posts are identical, as are the top rails, and the bottom rails. In FIG. 3, double line dotted arrows show how the various components are connected together to produce a completed corner post assembly.

As shown in FIG. 3, the corner post 4 is generally square in cross-section, and includes four dovetail grooves 28, 30, 32, 34. These grooves extend lengthwise, one down the centre of each of the four faces of the post, for the entire length of the post. In addition, the post 4 includes a square central interior aperture 36. The post 4 is typically manufactured by extrusion, usually from aluminum.

The top rail 8 (shown also in FIG. 4) includes a top wall 38 (of width W1 slightly less than the width W of the corner post 4), and an outside wall 40 having a slideway 42 therein to accommodate a strip 44 slidable in the slideway. At its bottom, the top rail 8 incldues two door guide channels 46 to accommodate the sliding doors 23.

At its inside surface, the top rail 8 includes an upper groove 47 and an alinged lower groove 48, which together form a slideway to accommodate a second sliding metal strip 50. The inside wall of the top rail 8 further includes a shelf support flange 52, on which the edges 22 of the top shelf 20 rest, and an L-shaped spacer flange 54 which serves to position the shelf 20 and prevent it from sliding from side to side. The upper surface of the flange 54 will normally be at the same level as the top of shelf 20 when the shelf 20 rests on the support flange 52.

The inside wall of the top rail 8 also incldes, just above the L-shaped spacer flange 54, a further flange 56 defining a groove 58 between itself and the spacer flange 54. The groove 58 is to accommodate clips (not shown) used conventionally to hold dividers to divide the top shelf 20 into sections to accommodate different types of merchandise.

Finally, the top rail 8 includes a central interior aperture or slideway 60 extending the entire length of the top rail. The slideway 60 is of a size to accommodate an end piece 62 with a sliding fit, so that end piece 62 is slidable back and forth in the aperture 60. The end piece 62 is generally U-shaped, having a pair of side walls 63, and includes a dovetail projection 64 at its end. The projection 64 is of a size to fit slidably in the dovetail groove 28 of the post 4.

The end piece 62 is held in position in slideway 60 of the top rail by a turnbuckle arrangement including a rod 66 hooked around a pin 68 extending between the side walls of the end piece 62. The rod 66 is threaded at its end, as shown at 70 (FIG. 4) and is screwed into a metal turnbuckle bolt 72. A second rod 74 similar to rod 66 is screwed into the other end of bolt 72 and is attached to another end piece (not shown) similar to end piece 62, at the other end of top rail 8. The turnbuckle arrangement normally holds the end pieces so that only dovetail projections project from the slideway 60, and is provided so that the end pieces can be drawn toward each other after the table is assembled, to tighten the table assembly.

The bottom rail 12 is a relatively simple aluminum extrusion having a shelf support flange 76, an L-shaped shelf spacer flange 78, and a pair of channels 80 in its top surface to accommodate the sliding doors. In its lower surface the bottom rail 12 includes an aperture 82 of a size to accommodate a lower end piece 84. The end piece 84 has a dovetail projection 86 at its end, of a size to fit slidably in the dovetail groove 28. The end piece 84 is typically fastened in the aperture 82 of the bottom rail 12 by sheet metal screws 88 (it can also be crimped, riveted or welded) in a position such that only the dovetail projection 86 projects from the aperture 82. The width W2 of the bottom rail 12 (not including flanges 76, 78) is typically equal to width W1, i.e. slightly less than the width W of the corner post 4.

The structure provided at each corner post further incldues an elongated side support and spacer member 90, of width W3 also slightly less than the width W of the corner post 4. The support and spacer member 90 includes a dovetail projection 92 extending along its rear face, the projection 92 being of a size to fit slidably in the dovetail slot 28. At its front face the member 90 includes a pair of channels 94 to accommodate the edges of the sliding doors 21, 22.

The corner post assembly also includes a bottom support and spacer member 96, of a size and shape to fit slidably in the dovetail groove 28 with its outer surface 98 flush with the outer surface of the corner post. Further filler strips 100, 102 are provided to fill those grooves in the corner post 4 that will not be used (grooves 32, 34).

Finally, top and bottom caps 106, 108 (FIG. 3) are provided for each corner post. Each cap is similar and includes a square plug 110 insertable into the aperture 36, and a square end plate 112 which exactly covers the top or bottom of the corner posts. The edges of the end plates 112 are flush with the sides of the corner posts.

With regard to assembly of the table, some of the components illustrated are assembled at the factory to simplify operations at the site. These components are the end pieces 84 for the bottom rails, and the end pieces 62 and turnbuckles for the top rails. In addition the bottom caps 108 are inserted into the corner posts at the factory and are held in position either by set screws through the corner posts, or by crimping as indicated at 113, in the grooves where the crimps will later be hidden.

At the site the various parts are laid out and further assembly begins. It will be apparent that various alternative procedures can be followed in assembling the overall table, and for simplicity, the way in which just two top and bottom rails 8, 12 (and their associated structure) are connected to the corner posts 4 and 5 will first be described. A typical sequence of steps for assembling the entire table will then be described.

To assemble rails 8, 12 to posts 4 and 5, firstly, lower spacer strip 96 is inserted into groove 28 and slid down to bottom cap 108. The two unused grooves 32, 34 to which nothing is to be connected, are filled by inserting filler strips 100, 102 (which can be painted in bright colours for decorative purposes). A similar procedure is followed at corner post 5.

Next, the dovetail projection 86 of the end piece 84 of the bottom rail 12 is inserted into the top of the groove 28 of the corner post 4 and slid downwardly until it comes to rest on the top of the lower support and spacer member 96. It is assumed that the corner post 4 is held in an upright orientation at this time. At this time, the dovetail projection of the end piece (not shown) at the other end of the bottom rail 12 is slid down the corresponding groove of the corner post 5 to the top of its lower support and spacer member (not shown).

Next, the dovetail projection 92 of the intermediate support and spacer member 90 is inserted into the groove 28 of corner post 4, and the intermediate support and spacer member 90 is slid downwardly until its bottom rests on the upper surface of the lower rail 12. A similar procedure is followed at the corner post 5.

Next, the top rail 8 is readied for insertion. Firstly, the end of the metal strip 44 is inserted into the slideway 42 at the front surface of the top rail, and strip 44 is slid into position is slideway 42. Strip 44 extends the entire length of the top rail and serves simply to provide an attractive ornamentation for the top rail. For example, strip 44 may be finished in a bright decorative colour.

Next, the metal strip 50 is slid into position in the grooves 47, 48 at the back of the top rail 12. The metal strip 50 extends very slightly less than half the length of the top rail 8, and is accompanied by a further similar metal strip 50a (FIG. 1) so that the two strips act in effect as sliding doors, both sliding in the same grooves 47, 48 (which are wide enough to accommodate both strips). The two strips can thus be slid to one side of the top rail 8 to expose the turnbuckle bolt 72.

After the top rail 8 is readied, the dovetail projection 64 of its end piece 62 is inserted into the groove 28 of corner post 4 and slid downwardly until the bottom of the top rail 8 rests on the top of the intermediate support and spacer member 90. The dimensions of the lower support and spacer member 96, the bottom rail 12, the intermediate support and spacer member 90, the top rail 8, and the corner post 4 are made such that at this time, the upper surface 38 of the top rail 8 is flush with the upper surface of the corner post 4.

At the time when the projection 64 of end piece 62 of the top rail is inserted in groove 28 of corner post 4, the dovetail projection of the corresponding end piece (not shown) at the other end of top rail 8 is inserted in the appropriate groove in corner post 5. Top caps 106 are then inserted and may be held in position with set screws, such as screw 118 (FIG. 3) to prevent disassembly of the unit.

This completes the description of the manner in which the top and bottom rails are assembled to the corner posts. A typical sequence of steps for assembling the entire table will next be described with reference to FIGS. 1 and 5, bearing in mind that the procedure may be varied substantially if desired. Typically the first step is to insert all of the lower support and spacer members 96 in the corner posts. Then, all the unused grooves in the corner posts are filled with full length filler strips 100, 102.

Figure 6:
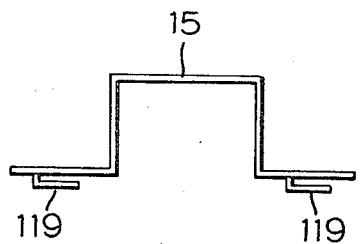
FIG. 6 is an end view showing a middle support of the table of FIG. 1.

Next, the side bottom rails 11, 13 are connected to the corner posts (FIG. 5). The lower middle support 15 is next connected to the bottom rails 11, 13. This connection is achieved by providing support 15 with two punched tabs 119 (FIG. 6) at each end, these tabs fitting in corresponding slots (not shown) in the shelf support flanges 76 of the bottom rails. The tabs 119 at one end of the middle support 15 are directed in the opposite direction to the tabs at the other end, for a better connection. When connected, the top surface of the lower middle support 15 is flush with the upper surface of the shelf spacer flanges 78 of the bottom rails. Holes 120 are stamped in the middle supports for insertion of standards if desired, to support upper sleeves. Support plates (not shown) are welded beneath the holes 120 in the lower middle support 15, to support the standards.

Next, four intermediate spacer members 90 are inserted as shown in FIG. 5, and end panels 24 are then inserted. Top rails 7, and 9 are next inserted, and then the upper middle support 14 is mounted, in the same way as the lower middle support 15. The front and back bottom rails are next inserted (these could also have been inserted at the same time as the side bottom rails 11, 13); then their associated intermediate support and spacer members 90 are inserted, and then the top front and back rails 8, 10 are inserted.

Next the X brace turnbuckles 16, 17 are mounted (through holes 119 in the middle supports); the bottom shelves are then placed in position; and the X brace turnbuckles 16, 17, and the turnbuckles 72 in the upper rails, are all tightened. The slider strips 50, 50a covering the top rail turnbuckles are then slid to positions such that they cover these turnbuckles, and the top shelf 20 is dropped into position. The upper post caps 106 are then inserted into the tops of the corner posts and are tightened by set screws 118, to prevent unauthorized removal. The sliding doors 23 may be inserted at any time after the front and back top and bottom rails are in position simply by inserting the tops of the doors into the channels 46 in the bottom of the top rails, and lifting the doors upwardly until their tops clear the bottom of channels 80 in the bottom rails. The bottoms of the doors are then dropped into channels 80, the channels 46 being of sufficient height that they still retain the tops of the doors.

It will be noted that the shelf support and spacer flanges of each top and bottom rail (e.g. flanges 52, 54 of top rail 8 and flanges 76, 78 of bottom rail 12) are cut back at a 45 degree angle, so as not to interfere with the corresponding flanges of the other top and bottom rails when the table is assembled.

It will be appreciated that the structure just described is a modular structure and may be extended in any direction as desired. For example, as shown diagrammatically in FIG. 7, a further section may be added to the end of the table 2 of FIG. 1 by removing the filler strips 100 in the corner posts 3 and 4 and adding on a further table section generally indicated at 121. The parts used in table section 121 are marked with primed reference numerals to indicate their correspondence to those already described. Further table sections may be added onto the back of the structure shown in FIG. 7 to produce for example a square cluster of four units.

In a structure such as that shown in FIG. 7, there is no need to have the top rail 7 of FIG. 1 exposed to view, and in addition the bottom rail below top rail 7 is entirely hidden. Because these members are hidden, welded joints may be used therein, and accordingly a generally rectangular frame member 122 (FIG. 8) may be used to replace the top rail 7 and the bottom rail below it. Frame member 122 consists of top and bottom rails 123, 124, each having an upper surface 126, vertical shelf spacer surfaces 128, and a shelf support surface 130. The top and bottom rails 123, 124 are joined by posts 132 welded thereto (the welded joints at rail 123 are on its underside and are therefore not visible), and dovetail extrusions 134 (typically the same extrusions as end piece 84, FIG. 3) are fastened to posts 132 by any appropriate means, such as screws. The frame member 122 is completed at the factory as a unit and need only be dropped into position as shown in FIG. 7.

No X brace turnbuckle arrangement is needed for the additional unit shown in FIG. 7; it is found that one such brace is sufficient in each line of units.

The frame construction just described is extremely easy to assemble. No tools are required at the site except for a wrench to turn the turnbuckles. In addition, if desired, an allen wrench may be used to tighten the screws holding the top caps in position. Because the structure shown is made up primarily of extruded members, it is relatively inexpensive to manufacture, and yet it presents an attractive appearance. The need for welded joints at exposed locations is eliminated, thus eliminating expensive finishing of such welded joints.

It will be appreciated that various modifications can be made for the structure described. For example, the shelves can be made smaller and the middle support 14, 15 and X brace turnbuckles 16, 17 eliminated (although more side sway may then occur). The table can be made triangular, in which case each corner post would be triangular and would have three longitudinal grooves instead of four. The central aperture in each corner post can be round instead of square, and the corner posts, even if square, can be modified to eliminate groove 32, or grooves 32, 34. Such an assignment limits the extendibility of the basic module but avoids the need for filler strips such as strips 100, 102 at the exposed surfaces of the corner posts.

Since the widths W1 to W3 of the top and bottom rails and intermediate support and spacer members 90 are all slightly less than the width W of the corner posts, slight burrs on these members need not be removed to obtain a smooth connection with the corner posts.

It may be noted that usually the top rails will be made very slightly longer (e.g. 1/32 inch) than the bottom rails. This clamps the end panels 24 when the turnbuckles of the top side rails 7, 9 are tightened, and it does not interfere with the action of the sliding doors. (This assumes that the end panels 24 are the same length as the top rails, i.e. slightly longer than the bottom rails.)

If desired, the corner posts could be made as part of a side frame assembly and each post could be provided with just one dovetail groove, to assemble the side frame assemblies together. This would increase the amount of fabrication required at the factory, however.

Although a dovetail type groove has been shown, it will be appreciated that other forms of interlocking grooves and projections, such as T-shaped grooves and projections, may be used if desired. Accordingly, the term "interlocking groove" is used in the appended claims, to define a groove of the type having a relatively wide interior portion and a relatively narrow entrance portion, and the term "interlocking projection" is used to define a co-operating projection having a relatively wide free end, and a relatively narrower neck portion, the interlocking projection being slidable in the interlocking groove and being removable therefrom only by sliding out the end of the groove.

What we claim as our invention is:

1. A frame structure for a table or the like, comprising:
   (a) a post of substantially square cross-section having a longitudinal interlocking groove extending longitudinally along each of at least two faces thereof for the entire length of said post,
   (b) a bottom rail having a first interlocking projection at each end thereof, said projection being slidable in said groove and mating with said groove to prevent movement of said bottom rail away from said post,
   (c) an elongated intermediate spacer member having a second interlocking projection thereon, so that said second projection may be inserted in said groove after said bottom rail is connected to said post and said second projection may then be slid along said groove until the bottom of said spacer member rests on the top of said bottom rail,
   (d) and a top rail having a third interlocking projection at each end thereof, so that after said bottom rail and said intermediate spacer member are connected to said post, said third interlocking projection may be slid into said groove and slid downwardly until the bottom of said top rail rests on the top of said intermediate spacer member,
   (e) and a bottom spacer member shaped to form a fourth interlocking projection along its length, so that said bottom spacer member can be inserted in said groove initially and slid down to the bottom of said post, whereby the bottom of said bottom rail will be supported by the top of said bottom spacer member so that said bottom rail is spaced from the ground.

2. A frame structure according to claim 1 wherein said top rail includes an interior sideway at each end thereof, and a movable end piece at each end slidable lengthwise along said top rail in said slideway, said third interlocking projections being at the outer ends of each said end piece, and turnbuckle means extending between said end pieces to draw them together to tighten said frame structure.

3. A frame structure according to claim 2 wherein said top rail includes a second slideway along its length in a side surface thereof, and a pair of thin cover plates slidable in said second slideway, said second slideway being positioned so that said turnbuckle assembly is exposed through said second slideway when one cover plate is slid over the other cover plate in said second slideway.

4. A frame structure according to claim 1 wherein said intermediate spacer member contains a pair of channels therein, in its surface opposite said second interlocking projection, said channels being adapted to accommodate a pair of sliding doors slidable between said top and bottom rails, and said top and bottom rails contain further channels in their lower and upper surfaces respectively for said sliding doors.

5. A frame structure according to claim 1 wherein said post includes a central aperture, said structure further including a top and bottom caps insertable into said central aperture, said caps having end surfaces of a size to cover the ends of said post when said caps are inserted into said post, said structure further including means for retaining said caps on said post.

6. A frame structure according to claim 1 wherein said post includes interlocking grooves in all four surfaces thereof, said structure further including at least one filler member of a shape to fit within said grooves to fill a groove into which it is inserted and render the surface of said post flat, so that said filler member may be inserted in unused grooves in said corner post to improve the appearance of said structure.

7. A frame structure according to claim 1 wherein said top and bottom rails each include a shelf support flange projecting therefrom to support top and bottom shelves respectively.

8. A table having:
   (a) four posts arranged in a rectangular configuration, each post having two faces facing the other posts, each of said two faces including a longitudinal interlocking groove therein extending longitudinally therealong for the entire length of said face,
   (b) a bottom cap fixed to the bottom of each post,
   (c) eight bottom support and spacer members each shaped to form a first interlocking projection, one such member in each of said grooves adjacent said bottom caps,
   (d) four bottom rails each having a second interlocking projection at each end thereof, said bottom rails joining said posts with said second interlocking projections being in said grooves and resting on said bottom support and spacer members,
   (e) eight intermediate support and spacer members each having a third interlocking projection thereon, said third interlocking projections being in said grooves and resting on said bottom rails,
   (f) four top rails each having a fourth interlocking projection at each end thereof, said top rails joining the tops of said four posts with said fourth interlocking projections being in said grooves and resting on said intermediate support and spacer members,
   (g) and means to tighten at least some of said rails to said posts to prevent disassembly of said table.

9. A table according to claim 8 wherein said top and bottom rails, said bottom and intermediate support and spacer members, and said posts, are all manufactured by extrusion.

10. A frame structure for a table or the like, comprising:
   (a) a pair of posts each adapted to be oriented vertically and each having a longitudinal interlocking groove extending longitudinally along at least one face thereof for the entire height of such post.
   (b) a bottom rail of predetermined length, said bottom rail having a first interlocking projection at each end thereof, so that said first projection can be inserted into and slid along said grooves to connect said bottom rail to said posts with said bottom rail extending in a horizontal orientation between said posts,
   (c) a top rail of length substantially equal to said predetermined length, said top rail having a second interlocking projection at each end thereof, so that said second interlocking projections can be inserted into and slid along said grooves to connect said top rail to said posts with said top rail extending in a horizontal orientation between said posts,
   (d) and a pair of intermediate spacer members each having a third inetrlocking projection thereon, said intermediate spacer members being of height substantially equal to the vertical separation to be provided between said top and bottom rails and being of combined length, in a direction parallel to the direction of said top and bottom rails, substantially less than said predetermined length, so that after said bottom rail is connected to said posts, said third projections of said intermediate spacer members may be inserted one into said groove of each post and slid along such groove until the bottoms of said intermediate spacer members rest on the tops of said bottom rails, and said second interlocking projections of said top rail may then be inserted into said grooves and slid downwardly until the bottom of said top rail rests on the top of said intermediate spacer members, said intermediate spacer members and said top and bottom rails defining between them an enlarged space for accommodation of side panel means.

11. A frame structure according to claim 10 wherein each said post is substantially square in cross-section, thereby having four said faces, each post including a said groove in at least two of its faces.

12. A frame structure according to claim 10 wherein said intermediate spacer members each contains a pair of channels therein, in its surface opposite said second interlocking projection, said channels being adapted to accommodate a pair of sliding doors slidable between said top and bottom rails, and said top and bottom rails contain further channels in their lower and upper surfaces respectively for said sliding doors.

13. A frame structure according to claim 11 wherein each face of each said post includes a said interlocking groove, said structure further including at least one filler member of a shape to fit within said grooves to fill a groove into which it is inserted and render flat the surface of a said post containing such groove, so that said filler member may be inserted in unused grooves in said posts to improve the appearance of said structure.

14. A frame structure according to claim 11 wherein said top rail is of length very slightly greater than that of said bottom rail.

References Cited

UNITED STATES PATENTS

| | | | |
|---|---|---|---|
| 3,029,119 | 4/1962 | Spadolini | 312—264 |
| 3,150,903 | 9/1964 | Chapman et al. | 312—257 |
| 3,195,968 | 7/1965 | Freeman | 312—263 X |
| 3,360,320 | 12/1967 | Lust | 312—257 |
| 3,393,031 | 7/1968 | Morrill | 312—257 X |

C. A. NUNBERG, Primary Examiner

U.S. Cl. X.R.

312—194